（12）United States Patent
Miura et al.

(10) Patent No.: US 11,554,772 B2
(45) Date of Patent: Jan. 17, 2023

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Toyota (JP)

(72) Inventors: Taichi Miura, Toyota (JP); Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/560,357

(22) Filed: Dec. 23, 2021

(65) Prior Publication Data

US 2022/0219675 A1 Jul. 14, 2022

(30) Foreign Application Priority Data

Jan. 13, 2021 (JP) .............................. JP2021-003665

(51) Int. Cl.
*B60W 20/16* (2016.01)
*B60W 10/06* (2006.01)
(Continued)

(52) U.S. Cl.
CPC ............ *B60W 20/16* (2016.01); *B60W 10/06* (2013.01); *B60W 10/08* (2013.01); *F01N 9/002* (2013.01);
(Continued)

(58) Field of Classification Search
CPC ...... B60W 20/16; B60W 20/15; B60W 10/06; B60W 10/08; B60L 50/10; B60L 50/66; F01N 9/002; F02D 41/029; F02D 41/0245
See application file for complete search history.

(56) References Cited

U.S. PATENT DOCUMENTS 6,195,985 B1 3/2001 Del Re et al.
2010/0024395 A1 2/2010 Gotou et al.
(Continued)

FOREIGN PATENT DOCUMENTS

EP  0 913 564 A1  5/1999
JP  2008-180190 A  8/2008
(Continued)

*Primary Examiner* — George C Jin
(74) *Attorney, Agent, or Firm* — Finnegan, Henderson, Farabow, Garrett & Dunner, LLP

(57) ABSTRACT

A controller for a hybrid electric vehicle includes processing circuitry configured to execute a manual filter regeneration process when satisfying a condition including that execution of the manual filter regeneration process is requested to decrease a PM deposit amount on the filter and that the hybrid electric vehicle is in a stopped state. In the manual filter regeneration process, when a state of charge of the battery becomes less than a discharge threshold value, an output of an internal combustion engine is converted to electric power for charging the battery while the filter is supplied with oxygen from the engine. Further, when the state of charge of the battery becomes greater than or equal to a charge threshold value that is greater than or equal to the discharge threshold value, an output shaft of the engine is rotated with the motor to supply the filter with oxygen from the engine.

13 Claims, 4 Drawing Sheets

(51) Int. Cl.
  *B60W 10/08* (2006.01)
  *F01N 9/00* (2006.01)
  *F02D 41/02* (2006.01)

(52) U.S. Cl.
  CPC ..... *F02D 41/029* (2013.01); *B60W 2510/085* (2013.01); *F01N 2900/1606* (2013.01)

(56) References Cited

U.S. PATENT DOCUMENTS

| | | | | |
|---|---|---|---|---|
| 2010/0063659 | A1* | 3/2010 | Ogiso | F02D 41/0245 |
| | | | | 180/65.265 |
| 2011/0197568 | A1* | 8/2011 | Beaucaire | F02D 41/029 |
| | | | | 60/286 |
| 2011/0257821 | A1* | 10/2011 | Beaucaire | B60W 20/16 |
| | | | | 180/65.265 |
| 2012/0210699 | A1* | 8/2012 | Ruhland | F02D 41/405 |
| | | | | 60/274 |
| 2017/0320483 | A1* | 11/2017 | Ishihara | F01N 3/023 |
| 2019/0234329 | A1* | 8/2019 | Hattar | F02D 41/0087 |
| 2019/0301329 | A1* | 10/2019 | Zink | F01N 3/0238 |
| 2019/0390620 | A1* | 12/2019 | Dudar | G07C 5/085 |
| 2020/0032762 | A1* | 1/2020 | Hosogi | F02P 5/045 |
| 2020/0047741 | A1 | 2/2020 | Nose et al. | |

FOREIGN PATENT DOCUMENTS

| | | | |
|---|---|---|---|
| JP | 2009-057045 A | | 3/2009 |
| JP | 2010-125906 A | | 6/2010 |
| JP | 2012246900 A | * | 12/2012 |
| JP | 2019-152149 A | | 9/2019 |
| JP | 2020-029800 A | | 2/2020 |

* cited by examiner

CONTROLLER FOR HYBRID ELECTRIC VEHICLE AND METHOD FOR CONTROLLING HYBRID ELECTRIC VEHICLE

BACKGROUND ART

1. Field

The following description relates to a controller for a hybrid electric vehicle and a method for controlling a hybrid electric vehicle.

2. Description of Related Art

An internal combustion engine known in the art includes a gasoline particulate filter (GPF) in an exhaust passage. The GPF removes particulate matter (PM) from exhaust.

Typically, when the amount of PM deposit on the GPF becomes greater than or equal to a threshold value, the GPF is regenerated through a control that increases the temperature of the GPF to burn the PM. The control for regenerating the GPF includes, for example, an automatic filter regeneration control and a manual filter regeneration control. The automatic filter regeneration control is automatically executed when an execution condition is satisfied while the vehicle is traveling. The manual filter regeneration control is initiated by an operation for starting a regeneration control.

Japanese Laid-Open Patent Publication No. 2020-029800 discloses a manual filter regeneration control that burns PM when the vehicle is driven. Specifically, a GPF forcible regeneration request tool is used at a car dealer to initiate a regeneration control. In the manual filter regeneration control, a special engine control is executed to burn the PM while the vehicle is traveling. The control increases the temperature of the GPF to burn the PM and regenerate the GPF. When an automatic gear transmission shifts gears during the special engine control, shift shock has a tendency to occur. Thus, while the manual filter regeneration control is executed, the transmission is kept at a predetermined gear (e.g., second gear) so that gears are not shifted and shift shock does not occur.

With the manual filter regeneration control described in the patent publication, the vehicle needs to be traveling. In other words, the manual filter regeneration control cannot be executed when the vehicle is not moving. The reason for this is as follows. In order to maintain the temperature of the GPF at a predetermined value or higher to burn the PM, the internal combustion engine needs to be driven for a certain amount of time under a high load so that hot exhaust is delivered to the GPF. In the above-described manual filter regeneration control, the torque produced by the operation of the internal combustion engine is consumed as the vehicle travels. Thus, the internal combustion engine is continuously driven under a high load to burn the PM.

However, it may be difficult to continue driving the internal combustion engine under a high load due to traffic conditions in a city. In such a case, the manual filter regeneration control, which requires the vehicle to be traveling, may take time to complete regeneration of the GPF. Also, to complete regeneration of the GPF, the vehicle needs to be driven by a driver. Thus, manpower is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a hybrid electric vehicle is provided. The hybrid electric vehicle includes an internal combustion engine having cylinders, a motor, a battery configured to supply the motor with electric power, and a filter arranged in an exhaust passage of the internal combustion engine to remove particulate matter (PM) from exhaust. The controller includes processing circuitry. The processing circuitry is configured to execute a manual filter regeneration process when satisfying a condition including that execution of the manual filter regeneration process is requested to decrease a PM deposit amount on the filter and that the hybrid electric vehicle is in a stopped state. The manual filter regeneration process includes a filter regeneration battery charge process and a filter regeneration battery discharge process. In the filter regeneration battery charge process, an output of the internal combustion engine is converted to electric power for charging the battery while the filter is supplied with oxygen from the internal combustion engine when a state of charge of the battery becomes less than a discharge threshold value. In the filter regeneration battery discharge process, an output shaft of the internal combustion engine is rotated with the motor to supply the filter with oxygen from the internal combustion engine when the state of charge of the battery becomes greater than or equal to a charge threshold value that is greater than or equal to the discharge threshold value.

In another general aspect, a method for controlling a hybrid electric vehicle is provided. The hybrid electric vehicle includes an internal combustion engine having cylinders, a motor, a battery configured to supply the motor with electric power, and a filter arranged in an exhaust passage of the internal combustion engine to remove particulate matter (PM) from exhaust. The method includes executing a manual filter regeneration process when satisfying a condition including that execution of the manual filter regeneration process is requested to decrease a PM deposit amount on the filter and that the hybrid electric vehicle is in a stopped state. The manual filter regeneration process includes a filter regeneration battery charge process and a filter regeneration battery discharge process. In the filter regeneration battery charge process, an output of the internal combustion engine is converted to electric power for charging the battery while the filter is supplied with oxygen from the internal combustion engine when a state of charge of the battery becomes less than a discharge threshold value. In the filter regeneration battery discharge process, an output shaft of the internal combustion engine is rotated with the motor to supply the filter with oxygen from the internal combustion engine when the state of charge of the battery becomes greater than or equal to a charge threshold value that is greater than or equal to the discharge threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A controller 39 for a hybrid electric vehicle in accordance with a first embodiment will now be described with reference to FIGS. 1 to 7.

Vehicle Configuration

Figure 1:
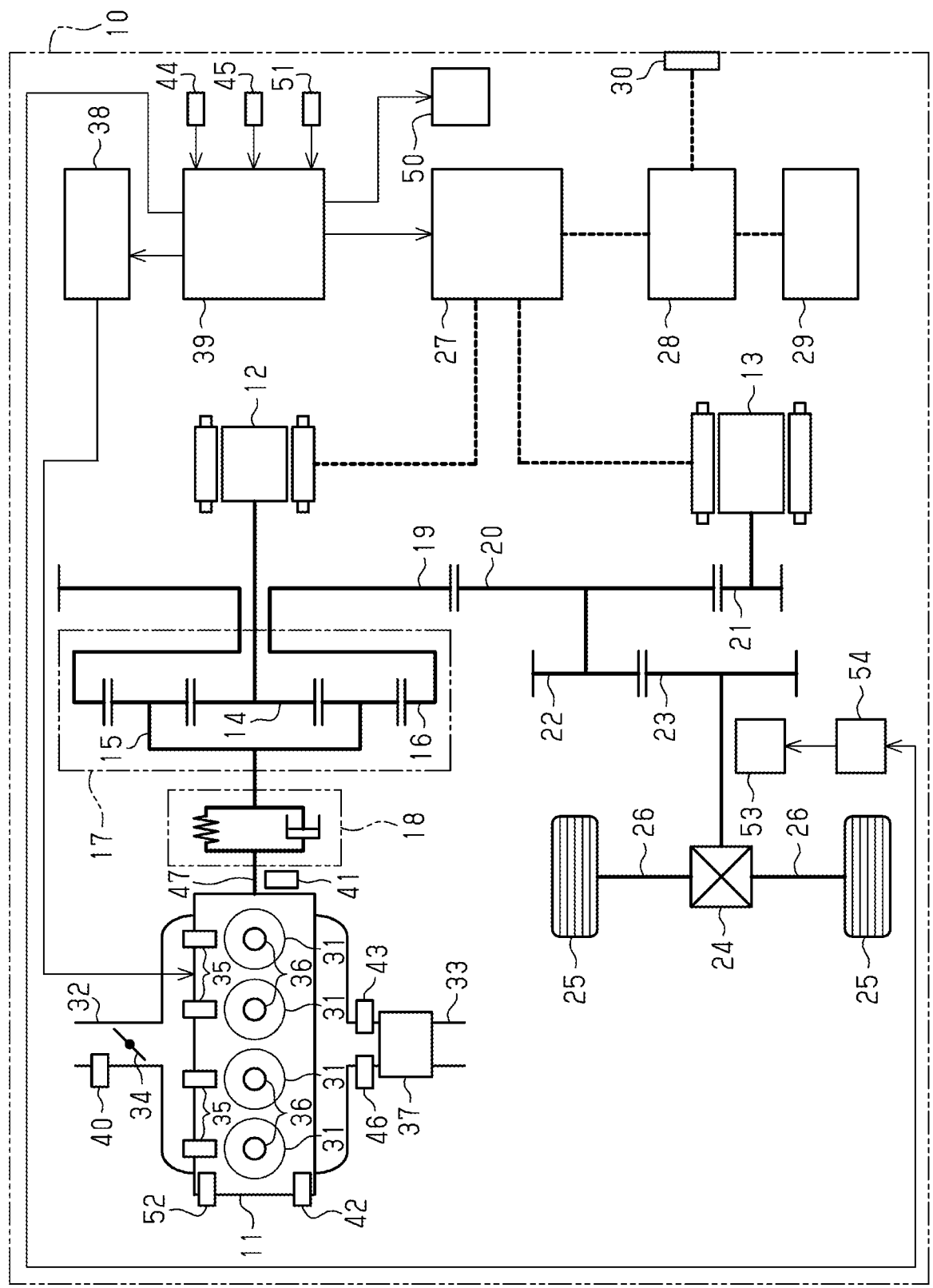
FIG. 1 is a schematic diagram showing a controller in accordance with a first embodiment and a hybrid electric vehicle controlled by the controller.

As shown in FIG. 1, a hybrid electric vehicle 10 in the present embodiment includes an internal combustion engine (hereafter, engine) 11. Hereafter, the hybrid electric vehicle 10 will be described as the vehicle 10. The vehicle 10 includes a battery 28. The vehicle 10 includes a first motor 12 and a second motor 13. The first motor 12 and the second motor 13 are each operated in a motor mode and a generator mode. In other words, the first motor 12 and the second motor 13 each function as a motor and a generator. In the motor mode, the first motor 12 and/or the second motor 13 is supplied with electric power from the battery 28 and the electric power is converted to driving force. This allows the first motor 12 and/or the second motor 13 to drive the vehicle 10. In the generator mode, the first motor 12 and/or the second motor 13 uses driving force supplied from an external device to generate electric power. Then, the electric power generated by the first motor 12 and/or the second motor 13 charges the battery 28. The vehicle 10 includes an in-vehicle electrically driven device 29 that may be supplied with electric power from the battery 28. The in-vehicle electrically driven device 29 includes, for example, an electrically driven air-conditioner, a headlamp, a defroster, a seat heater, an electrically driven water pump for a cooling system, and an electrically driven fan.

A planetary gear mechanism 17 is arranged in the vehicle 10. The planetary gear mechanism 17 includes three rotational elements. Specifically, the planetary gear mechanism 17 includes a sun gear 14, a planetary carrier 15, and a ring gear 16. The planetary carrier 15 is connected to a crankshaft 47 that is an output shaft of the engine 11 by a transaxle damper 18. The sun gear 14 is connected to the first motor 12. The ring gear 16 is formed integrally with a counter drive gear 19. The counter drive gear 19 is meshed with a counter driven gear 20. The second motor 13 is connected to a reduction gear 21 that is meshed with the counter driven gear 20.

The counter driven gear 20 is connected to a final drive gear 22 in a manner rotatable integrally with the final drive gear 22. The final drive gear 22 is meshed with a final driven gear 23. The final driven gear 23 is coupled to drive axles 26 of drive wheels 25 by a differential mechanism 24. The vehicle 10 includes a parking lock 53 that physically restricts rotation of the drive wheels 25. The parking lock 53 can be actuated by a shift electronic control unit (ECU) 54.

The first motor 12 and the second motor 13 are electrically connected to the battery 28 via a power control unit (hereafter, PCU) 27. The PCU 27 regulates the amount of electric power supplied from the battery 28 to the first motor 12 and the second motor 13. The PCU 27 regulates the amount of electric power supplied from the first motor 12 and the second motor 13 to the battery 28. That is, the PCU 27 regulates the discharge amount and the recharge amount. The vehicle 10 includes a power supply connector 30 that is connectable to an external device. The power supply connector 30 allows the vehicle 10 to feed power to a device outside the vehicle 10.

The engine 11 includes cylinders 31, an intake passage 32, and an exhaust passage 33. In the example shown in FIG. 1, the engine 11 is a four-cylinder engine including four cylinders 31. The engine 11 includes a variable valve timing mechanism 52 that varies the opening timing of intake valves. Intake air flows through the intake passage 32 into each cylinder 31. In each cylinder 31, air-fuel mixture is burned. The combustion in the cylinders 31 produces exhaust that flows through the exhaust passage 33. The intake passage 32 includes a throttle valve 34 that adjusts the flow rate of intake air flowing through the intake passage 32. Each cylinder 31 includes a fuel injection valve 35 that injects fuel into the intake air. Each cylinder 31 may include more than one fuel injection valve 35. Alternatively, the number of fuel injection valves 35 may vary between the cylinders 31. Further, each cylinder 31 includes an ignition plug 36 that ignites the mixture of air and fuel with an electric spark. Each cylinder 31 may include more than one ignition plug 36. Alternatively, the number of ignition plugs 36 may vary between the cylinders 31. Further, the exhaust passage 33 includes a filter 37 that traps the particulate matter (hereafter, PM) included in the exhaust. The filter 37 removes particulate matter from exhaust. The filter 37 is formed by a porous material and an oxidation catalyst carried on the surface of the porous material to accelerate oxidation of the trapped PM. The filter 37 is, for example, a gasoline particulate filter (hereafter, GPF).

Controller

The vehicle 10 includes an engine control unit 38 that is an electronic control unit for controlling the engine 11. Further, the vehicle 10 includes the controller 39 that centrally controls the shift ECU 54, the engine control unit 38, and the PCU 27. That is, the controller 39 controls the engine 11 with the engine control unit 38. Further, the controller 39 controls the first motor 12 and the second motor 13 by regulating the discharge amount and the recharge amount with the PCU 27. That is, the controller 39 controls the vehicle 10 by controlling the engine 11, the first motor 12, and the second motor 13. Each of the engine control unit 38 and the controller 39 is configured as a computer unit. The computer unit includes a read-only memory (ROM), a central processing unit (CPU), and a random-access memory (RAM). The ROM stores programs and data used for control. The CPU executes the program stored in the ROM. The RAM serves as a working field when the CPU executes a program.

The engine control unit 38 receives a detection signal of an air flow meter 40 that detects the amount of intake air in the engine 11. The engine control unit 38 receives a detection signal of a crank angle sensor 41 that detects the rotation angle of the crankshaft 47. The engine control unit 38 receives a detection signal of a coolant temperature sensor 42 that detects the temperature of coolant in the engine 11. The engine control unit 38 receives a detection signal of an exhaust temperature sensor 43 that detects the temperature of exhaust flowing into the filter 37. The engine control unit 38 receives a detection signal of an air-fuel ratio sensor 46. The air-fuel ratio sensor 46 is arranged in the exhaust passage 33 at an upstream side of the filter 37 to detect the oxygen concentration of the gas flowing through the exhaust passage 33. That is, the air-fuel ratio sensor 46 detects the air-fuel ratio of the air-fuel mixture. The engine control unit 38 calculates the rotational speed of the crankshaft 47 (hereafter, engine speed) based on a detection signal of the crank angle sensor 41. Further, the engine control unit 38 calculates an engine load factor KL from the engine speed and the intake air amount. The engine load factor KL will now be described. In an intake stroke, the amount of air flowing into each cylinder 31 is referred to as a cylinder inflow air amount. When the engine 11 is stably driven at the present engine speed with the throttle valve 34 fully open, the cylinder inflow air amount is referred to as the fully-open air amount. The engine load factor KL indicates a ratio of the present cylinder inflow air amount to the fully-open air amount. Further, the engine control unit 38 executes an air-fuel ratio feedback control based on a detection signal of the air-fuel ratio sensor 46 to adjust the fuel injection amount so that the air-fuel ratio of the air-fuel mixture approaches a target air-fuel ratio. For example, the engine control unit 38 may control the air-fuel ratio to be richer than the stoichiometric air-fuel ratio.

The controller 39 receives a current IB, a voltage VB, and a temperature TB of the battery 28. The controller 39 uses the current IB, the voltage VB, and the temperature TB to calculate the state of charge (SOC) of the battery 28. Further, the controller 39 receives a detection signal of an accelerator pedal sensor 44 that detects an accelerator pedal position ACCP. The accelerator pedal position ACCP indicates the amount of the accelerator pedal depressed by the driver. The controller 39 receives a detection signal of a vehicle speed sensor 45 that detects a vehicle speed V indicating the traveling speed of the vehicle 10. The controller 39 uses the accelerator pedal position ACCP and the vehicle speed V to calculate a required vehicle driving force that indicates a required value of the driving force of the vehicle 10. The controller 39 uses the required vehicle driving force, the state of charge SOC, and the like to calculate a required engine output that indicates a required value of the engine output. The controller 39 uses the required vehicle driving force, the state of charge SOC, and the like to calculate an MG1 required torque. The MG1 required torque indicates a required value of driving/regenerative torque of the first motor 12. The controller 39 uses the required vehicle driving force, the state of charge SOC, and the like to calculate an MG2 required torque. The MG2 required torque indicates a required value of driving/regenerative torque of the second motor 13. Then, a travel control of the vehicle 10 is performed. More specifically, the engine control unit 38 controls the output of the engine 11 in accordance with the required engine output. The PCU 27 controls the torque of the first motor 12 and the second motor 13 in accordance with the MG1 required torque and the MG2 required torque.

The controller 39 executes a manual filter regeneration process. A manual filter regeneration process supplies the filter 37 with oxygen to burn PM and remove the PM from the filter 37. A manual filter regeneration process regenerates the filter 37 by reducing the amount of PM deposited on the filter 37. Further, in the present embodiment, in a manual filter regeneration process, the controller 39 increases the load on the engine 11 to increase the exhaust temperature. This increases the temperature of the filter 37 in the exhaust passage 33 and accelerates combustion of the PM.

The controller 39 is configured to issue a notification related to regeneration of the filter 37 with a notification unit 50. The controller 39 is configured to issue a notification with the notification unit 50 to prompt a user to undergo maintenance of the filter 37 at a car dealer. The notification unit 50 may be, for example, a meter or a display of a navigation system or the like. The notification unit 50 may be, for example, a speaker. The user can respond to the notification by operating an input unit 51, such as a touch panel or a button, arranged in the vehicle 10. The input unit 51 is configured to receive an operation performed by the user to request for execution of a manual filter regeneration process for regenerating the filter 37.

PM Deposit Amount Estimation Process

Figure 2:
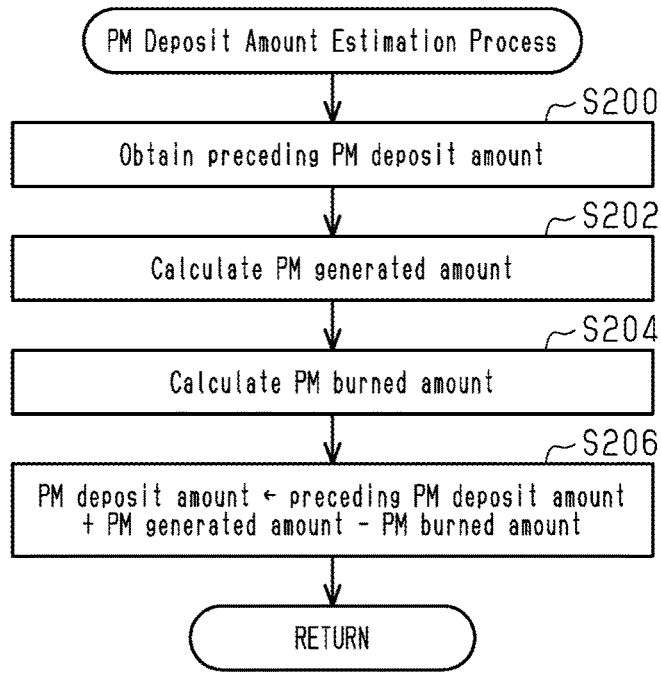
FIG. 2 is a flowchart illustrating a PM deposit amount estimation process.

A PM deposit amount estimation process for estimating the deposit amount of particulate matter on the filter 37 will now be described with reference to FIG. 2. The controller 39 repeatedly executes the PM deposit amount estimation process in predetermined cycles. The initial letter "S" in front of reference numerals means "step". The controller 39 obtains the preceding PM deposit amount (S200). The controller 39 calculates a PM generated amount (S202). The controller 39 calculates a PM burned amount (S204). The controller 39 subtracts the PM burned amount from the PM generated amount and then adds the difference to the preceding PM deposit amount to update the PM deposit amount (S206).

The PM generated amount is the amount of PM produced by combustion of the air-fuel mixture in the cylinders 31. The controller 39 calculates the PM generated amount based on the driving state of the engine 11, specifically, the intake air amount, the fuel injection amount, and the like.

The PM burned amount is the amount of the PM burned in the filter 37. The temperature of the filter 37 increases as the temperature of the gas flowing into the filter 37 increases. Thus, the temperature of the filter 37 is calculated from the temperature detected by the exhaust temperature sensor 43. The controller 39 uses a heat balance model of the filter 37 to estimate the temperature of the filter 37, or the filter temperature. The heat balance model is obtained based on the outside air temperature and the temperature and the flow rate of the gas flowing into the filter 37. The flow rate of the gas flowing into the filter 37 is determined from the intake air amount and the fuel injection amount. The intake air temperature detected by the air flow meter 40 is used as the outside air temperature. Combustion of the PM deposited on the filter 37 is ensured if gas including oxygen flows into the filter 37 when the filter temperature is higher than or equal to the catalyst activation temperature. The PM may be partially burned even if the filter temperature is lower than the catalyst activation temperature. Since oxygen is necessary to burn the PM, the amount of burned PM in the filter 37 in such a case is determined in accordance with the amount of oxygen in the gas flowing into the filter 37. The oxygen concentration of the gas flowing into the filter 37 is determined from the detection result of the air-fuel ratio sensor 46. Accordingly, the controller 39 calculates the PM burned amount based on the gas temperature detected by the exhaust temperature sensor 43, the oxygen concentration detected by the air-fuel ratio sensor 46, the intake air amount, and the fuel injection amount.

Setting of Filter Regeneration Process Flag

Figure 3:
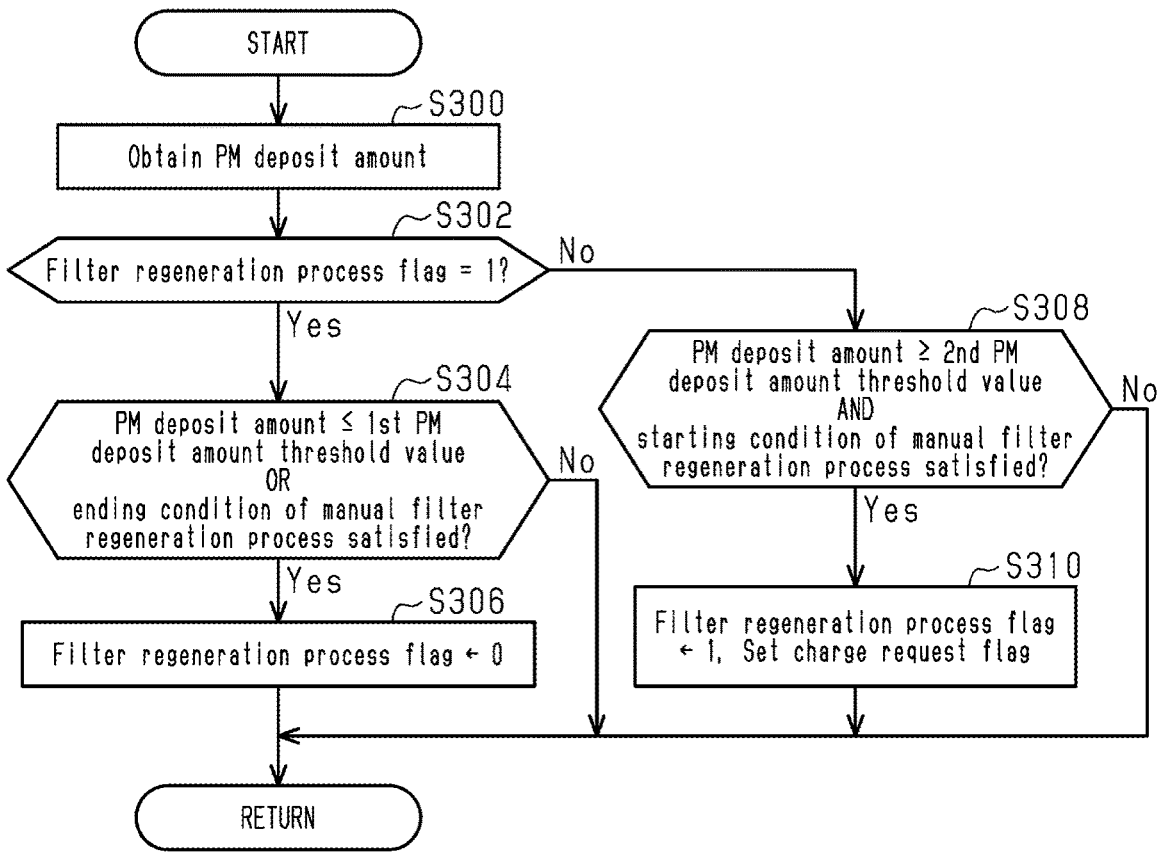
FIG. 3 is a flowchart related to setting of a filter regeneration process flag.
Figure 6:
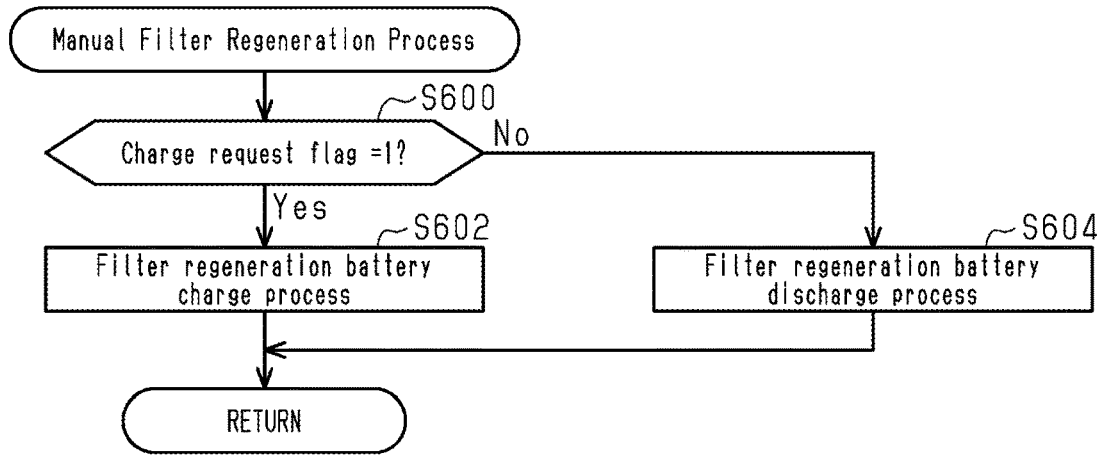
FIG. 6 is a flowchart illustrating a manual filter regeneration process.

A flowchart related to the setting of a filter regeneration process flag will now be described with reference to FIG. 3. The process of FIG. 3 is always executed in predetermined cycles as long as the vehicle 10 is being operated. The filter regeneration process flag is initially set to 0. As described below, the filter regeneration process flag is set to 1 when a starting condition of a manual filter regeneration process is satisfied and the PM deposit amount is large such that a manual filter regeneration needs to be performed at a car dealer. When the filter regeneration process flag is set to 1, a manual filter regeneration process illustrated in FIG. 6 is initiated. The starting condition of the manual filter regeneration process is that the gear shifter is arranged at the Park position and execution of a manual filter regeneration process is requested. When the gear shifter is arranged at the Park position, it means that the vehicle 10 is in a stopped state. Specifically, the controller 39 executes a manual filter regeneration process when satisfying a condition including that execution of the manual filter regeneration process is requested and that the vehicle 10 is in a stopped state. An ending condition of the manual filter regeneration process is that the starting condition of the manual filter regeneration process is no longer satisfied.

In S300, the controller 39 obtains the PM deposit amount calculated by the PM deposit amount estimation process and then proceeds to S302. In S302, the controller 39 determines whether the filter regeneration process flag is 1.

When the filter regeneration process flag is 1 (S302: Yes), the controller 39 proceeds to S304. In S304, the controller 39 determines whether at least a condition in that the PM deposit amount is less than or equal to a first PM deposit amount threshold value is satisfied or the ending condition of the manual filter regeneration process is satisfied. The first PM deposit amount threshold value is set to a threshold value allowing for determination that the manual filter regeneration process has been sufficiently performed and the filter 37 has been regenerated. When an affirmative determination is given in S304 (S304: Yes), the controller 39 proceeds to S306. In S306, the controller 39 sets the filter regeneration process flag to 0 and then ends the present cycle. When a negative determination is given in S304 (S304: No), the controller 39 ends the present cycle without changing the filter regeneration process flag.

When the filter regeneration process flag is not 1 (S302: No), the controller 39 proceeds to S308. In S308, the controller 39 determines whether a condition in that the PM deposit amount is greater than or equal to a second PM deposit amount threshold value is satisfied and the starting condition of the manual filter regeneration process is satisfied. The second PM deposit amount threshold value is set to a threshold value allowing for determination that a certain amount of PM is deposited on the filter 37 such that a manual filter regeneration process needs to be performed. When an affirmative determination is given in S308 (S308: Yes), the controller 39 proceeds to S310. In S310, the controller 39 sets the filter regeneration process flag to 1. Further, in S310, the controller 39 sets a charge request flag in accordance with the state of charge SOC of the battery 28. Specifically, the controller 39 sets the charge request flag, which will be described later, to 1 when the state of charge SOC of the battery 28 is less than a charge threshold value. The controller 39 sets the charge request flag to 0 when the state of charge SOC of the battery 28 is greater than or equal to the charge threshold value. Then, the controller 39 ends the present cycle. When a negative determination is given in S308 (S308: No), the controller 39 ends the present cycle without changing the filter regeneration process flag.

Notification Process

Figure 4:
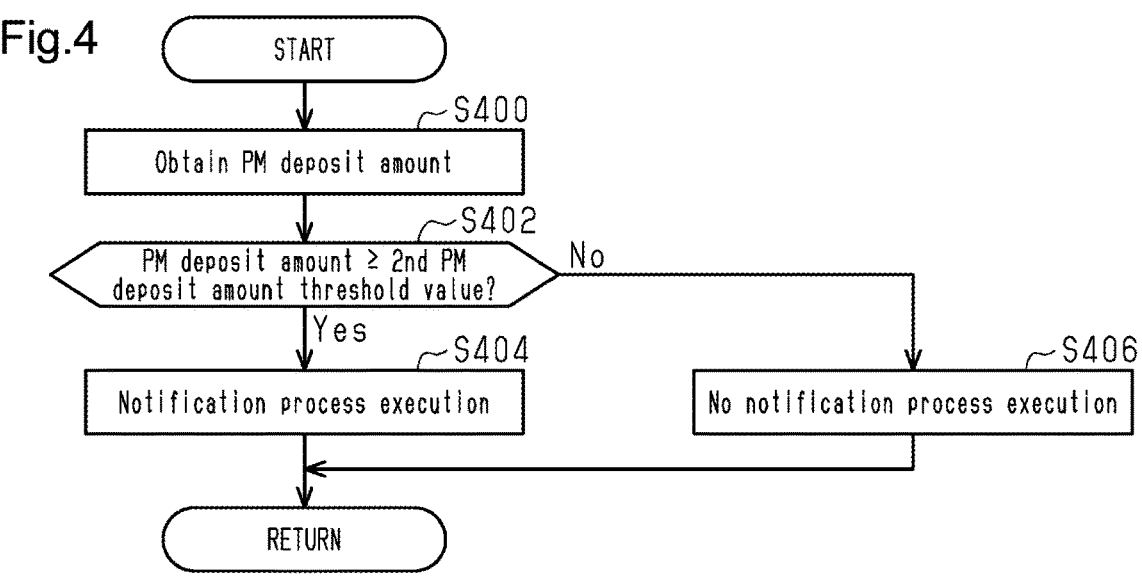
FIG. 4 is a flowchart related to a notification process.

A flowchart related to a notification process will now be described with reference to FIG. 4. A notification process notifies the user that the PM deposit amount is large such that manual filter regeneration needs to be performed by a car dealer. The process of FIG. 4 is always executed in predetermined cycles while the vehicle 10 is being operated.

In S400, the controller 39 obtains the PM deposit amount calculated in the PM deposit amount estimation process. In S402, the controller 39 determines whether the PM deposit amount is greater than or equal to the second PM deposit amount threshold value. As described above, the second PM deposit amount threshold value is set to a threshold value allowing for determination that a certain amount of PM is deposited on the filter 37 such that manual filter regeneration needs to be performed. When the PM deposit amount is greater than or equal to the second PM deposit amount threshold value (S402: Yes), the controller 39 proceeds to S404. In S404, the controller 39 executes a notification process. Then, the controller 39 ends the present cycle. For example, in S404, the controller 39 displays a message on a display of a meter to prompt a user to perform maintenance on the filter 37 at a car dealer. When the PM deposit amount is less than the second PM deposit amount threshold value (S402: No), the controller 39 proceeds to S406. In S406, the controller 39 does not execute a notification process. If a notification process is already being executed, the controller 39 stops the notification process in S406. If a notification process is not being executed, the controller 39 ends the present cycle.

Setting of Charge Request Flag

Figure 5:
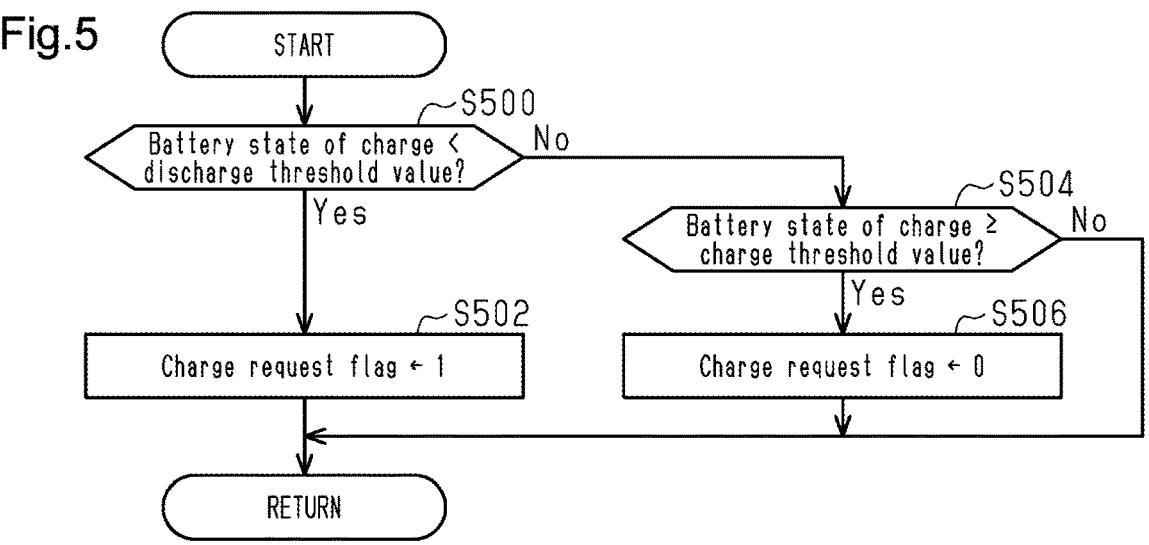
FIG. 5 is a flowchart related to setting of a charge request flag.

A flowchart related to setting of the charge request flag will now be described with reference to FIG. 5. The process of FIG. 5 is always executed in predetermined cycles while the vehicle 10 is being operated. When the charge request flag is 1, a control that charges the battery 28 is executed. When the charge request flag is 0, a control that discharges the battery 28 is executed. As will be described below, the charge request flag is set to 1 when the state of charge SOC of the battery 28 is less than a discharge threshold value that is smaller than the charge threshold value. The charge request flag is set to 0 when the state of charge SOC of the battery 28 is greater than or equal to the charge threshold value. In this manner, the state of charge SOC of the battery 28 is kept within a range between the discharge threshold value and the charge threshold value.

The discharge threshold value is, for example, 30%. When the filter regeneration process flag is 0, the charge threshold value is, for example, 45%. When the filter regeneration process flag is 1, the charge threshold value is, for example, 75%. That is, the charge threshold value when the filter regeneration process flag is 1 is greater than the charge threshold value when the filter regeneration process flag is 0. The reason for this is as follows. As described above in relation to the starting condition of manual filter regeneration process and steps S308 and S310, when the filter regeneration process flag is 1, the vehicle 10 is not moving. Accordingly, when the filter regeneration process flag is 1, charging through regenerative braking is not performed. When the filter regeneration process flag is 0, charging through regenerative braking may be performed. The charge threshold value is set to a relatively low value when the filter regeneration process flag is 0 to allow for charging through regenerative braking without causing overcharging.

In S500, the controller 39 determines whether the state of charge SOC of the battery 28 is less than the discharge threshold value. When the state of charge SOC of the battery 28 is less than the discharge threshold value (S500: Yes), the controller 39 proceeds to S502. In S502, the controller 39 sets the charge request flag to 1 and then ends the present cycle.

When the state of charge SOC of the battery 28 is greater than or equal to the discharge threshold value (S500: No), the controller 39 proceeds to S504. In S504, the controller 39 determines whether the state of charge SOC of the battery 28 is greater than or equal to the charge threshold value. When the state of charge SOC of the battery 28 is greater than or equal to the charge threshold value (S504: Yes), the controller 39 proceeds to S506. In S506, the controller 39 sets the charge request flag to 0 and then ends the present cycle. When the state of charge SOC of the battery 28 is less than the charge threshold value (S504: No), the controller 39 ends the present cycle without changing the charge request flag.

Manual Filter Regeneration Process

A manual filter regeneration process will now be described with reference to FIG. 6. A manual filter regeneration process is initiated under the condition that the filter regeneration process flag is set to 1 and is ended under the condition that the filter regeneration process flag is set to 0.

In S600, the controller 39 determines whether the charge request flag is 1. When the charge request flag is 1 (S600: Yes), the controller 39 proceeds to S602. In S602, the controller 39 executes a filter regeneration battery charge process. When the charge request flag is not 1 (S600: No), the controller 39 proceeds to S604. In S604, the controller 39 executes a filter regeneration battery discharge process.

A filter regeneration battery charge process is a process for converting the output of the engine 11 to electric power for charging the battery 28 while supplying the filter 37 with oxygen from the engine 11. For example, a filter regeneration battery charge process includes stopping fuel supplied to one or more of the cylinders 31 and supplying fuel to the remaining one or more of the cylinders 31. For example, a filter regeneration battery charge process includes stopping fuel supplied to one of the four cylinders 31 and performing combustion in the remaining three cylinders 31 at the air-fuel ratio controlled to be richer than the stoichiometric air-fuel ratio. In this manner, the filter 37 is supplied with oxygen from the cylinder 31 that is not supplied with fuel. Further, the energy produced by combustion in the three cylinders 31 is consumed when charging the battery 28.

A filter regeneration battery discharge process is a process for rotating the crankshaft 47, which is the output shaft of the engine 11, with the first motor 12 to supply the filter 37 with oxygen from the engine 11. Specifically, the first motor 12 uses the electric power of the battery 28 to rotate the crankshaft 47. This discharges the battery 28. For example, a filter regeneration battery discharge process includes stopping fuel supplied to every one of the four cylinders 31 and rotating the crankshaft 47 with the first motor 12. In this case, the filter regeneration battery discharge process stops supplying fuel to more of the cylinders 31 than the filter regeneration battery charge process. This discharges the battery 28 and supplies the filter 37 with oxygen from the engine 11.

Operation of First Embodiment

Figure 7:
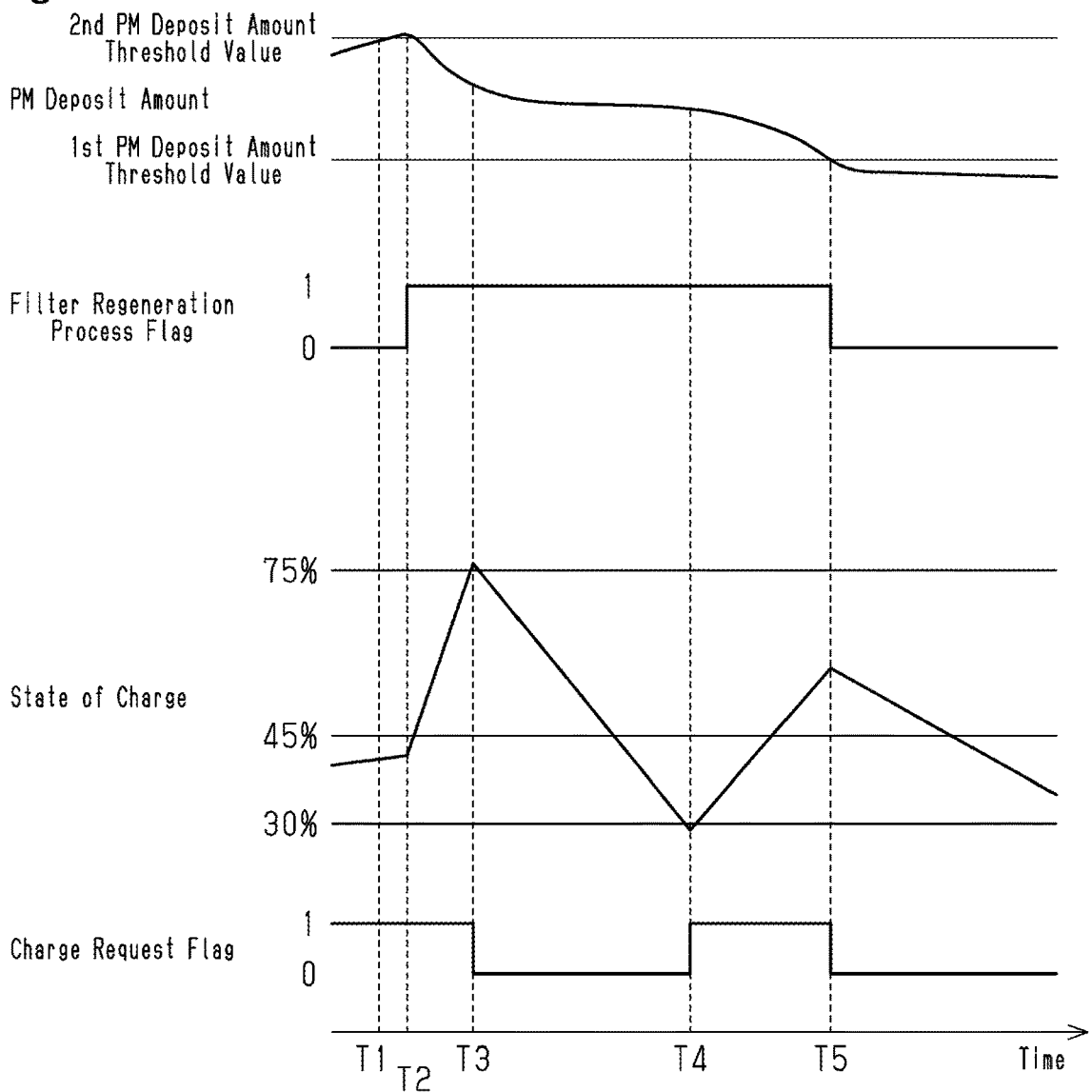
FIG. 7 is a time diagram showing changes in the PM deposit amount, the filter regeneration process flag, a state of charge, and the charge request flag.

The operation of the first embodiment will now be described with reference to FIG. 7. At time T1, the PM deposit amount becomes greater than the second PM deposit amount threshold value. Further, at time T2, the filter regeneration process flag is set to 1 when the starting condition of a manual filter regeneration process is satisfied. The filter regeneration process flag is set to 1 in a manner as described above in relation to S310. Also, the charge threshold value is increased from 45% to 75%. As shown in FIG. 7, the state of charge SOC of the battery 28 is less than the charge threshold value. Thus, the charge request flag is set to 1 in a manner as described above in relation to S310. In this manner, the filter regeneration battery charge process is initiated at time T2.

At time T3, the state of charge SOC of the battery 28 becomes greater than the charge threshold value. Thus, the charge request flag is set to 0. Accordingly, the filter regeneration battery discharge process is initiated at time T3.

At time T4, the state of charge SOC of the battery 28 becomes less than the discharge threshold value. Thus, the charge request flag is set to 1. Accordingly, the filter regeneration battery charge process is initiated at time T4.

At time T5, the PM deposit amount becomes less than the first PM deposit amount threshold value. Thus, the filter regeneration process flag is set to 0.

In this manner, the controller 39 repeatedly executes the filter regeneration battery charge process and the filter regeneration battery discharge process in accordance with the state of charge SOC of the battery 28 until the PM deposit amount becomes less than or equal to the first PM deposit amount threshold value. Consequently, the controller 39 ends the manual filter regeneration process when the PM deposit amount becomes less than or equal to the first PM deposit amount threshold value.

If the charge threshold value of the state of charge SOC were to be fixed regardless of the filter regeneration process flag, the controller 39 would be able to continue the filter regeneration battery charge process in only small periods of time. In the present embodiment, the charge threshold value of the state of charge SOC for when the filter regeneration process flag is set to 1 (75% in present embodiment) is greater than the charge threshold value of the state of charge SOC for when the filter regeneration process flag is set to 0 (45% in present embodiment). Thus, the controller 39 can continuously execute a filter regeneration battery charge process until the state of charge SOC reaches 75%. That is, the controller 39 can continue the filter regeneration battery charge process for a relatively long period of time. The filter regeneration battery charge process increases the temperature of the filter 37 more quickly than the filter regeneration battery discharge process. Therefore, the charge threshold value of the state of charge SOC that is increased when the filter regeneration process flag is set to 1 quickly raises the temperature of the filter 37.

Advantages of First Embodiment (1) With the above configuration, the processing circuitry of the controller 39 executes a manual filter regeneration process when satisfying the condition including that execution of a manual filter regeneration process is requested and that the vehicle 10 is in a stopped state. A filter regeneration battery charge process includes a filter generation battery charge process for converting the output of the engine 11 to electric power for charging the battery 28 while supplying the filter 37 with oxygen from the engine 11. In the filter regeneration battery charge process, the torque produced by the engine 11 is consumed when the battery 28 is charged. This generates load that is required to increase the temperature even when the vehicle is not moving. In the filter regeneration battery charge process, combustion in the engine 11 increases the exhaust temperature. This increases the temperature of the filter 37, which is arranged in the exhaust passage 33, and readily burns the PM.

The manual filter regeneration process includes the filter regeneration battery discharge process. Specifically, the filter regeneration battery discharge process is executed when the state of charge SOC of the battery 28 becomes greater than or equal to the charge threshold value. The storage capacity of the battery 28 is limited. Thus, the filter regeneration battery charge process needs to be interrupted before the battery 28 becomes overcharged to avoid deterioration of the battery 28. In the filter regeneration battery discharge process, the first motor 12 idles the engine 11 to continuously supply the filter 37 with oxygen while consuming the electric power of the battery 28. Execution of the filter regeneration battery discharge process in a state in which the temperature of the filter 37 has been increased by the filter regeneration battery charge process readily burns the PM. The manual filter regeneration process is not necessarily started from the filter regeneration battery charge process. The manual filter regeneration process may be started from the filter regeneration battery discharge process. The PM will also be burned in the filter regeneration battery discharge process.

The filter 37 can be regenerated in this manner without driving the vehicle 10 while maintaining the state of charge SOC of the battery 28 within a predetermined range.

(2) The supply of fuel to one or more of the cylinders 31 is stopped to effectively supply oxygen to the filter 37. Combustion in the remaining one or more of cylinders 31 produces torque consumed when the battery 28 is charged. Further, the filter 37 is supplied with hot exhaust from the cylinders 31 in which combustion is performed. This increases the temperature of the filter 37 effectively.

(3) The supply of fuel to one or more of the cylinders 31 is stopped to effectively supply oxygen to the filter 37. Combustion in the remaining one or more of cylinders 31 produces torque consumed when the battery 28 is charged. Further, combustion performed in the cylinders 31, in which the air-fuel ratio is controlled to be richer than the stoichiometric air-fuel ratio, generates exhaust including fuel components. Thus, fuel reacts with the oxygen supplied from the engine 11 to the filter 37 and increases the temperature of the filter 37 effectively.

(4) The filter regeneration battery discharge process stops supplying fuel to more cylinders 31 than the filter regeneration battery charge process. Thus, the torque produced by the engine 11 is smaller in the filter regeneration battery discharge process than the filter regeneration battery charge process. In the filter regeneration battery discharge process, torque produced by the engine 11 does not have to be consumed to charge the battery 28. Therefore, the filter regeneration battery discharge process quickly discharges the battery 28.

(5) The above configuration allows the filter 37 to be regenerated when the vehicle 10 is in a stopped state by executing a manual filter regeneration process until the PM deposit amount becomes less than or equal to the PM deposit amount threshold value.

Second Embodiment

A controller 39 in accordance with a second embodiment differs from the controller 39 in accordance with the first embodiment in that an electric power load increasing process is further executed in the manual filter regeneration process. The electric power load increasing process increases the electric power load on the vehicle 10. The electric power load increasing process decreases the state of charge SOC of the battery 28. For example, the electric power load increasing process includes a process for actuating the parking lock 53 and driving the second motor 13 in a state in which rotation of the drive wheels 25 is physically restricted to increase the electric power load on the second motor 13. For example, the electric power load increasing process includes a process for actuating the in-vehicle electrically driven device 29. The in-vehicle electrically driven device 29 may give actuation priority to a device that consumes a relatively large amount of electric power and has a relatively small effect on the manual filter regeneration process. For example, the electric power load increasing process may include a process for issuing a notification to prompt a user to feed electric power from the vehicle 10 to a device outside the vehicle 10.

Manual Filter Regeneration Process

Figure 8:
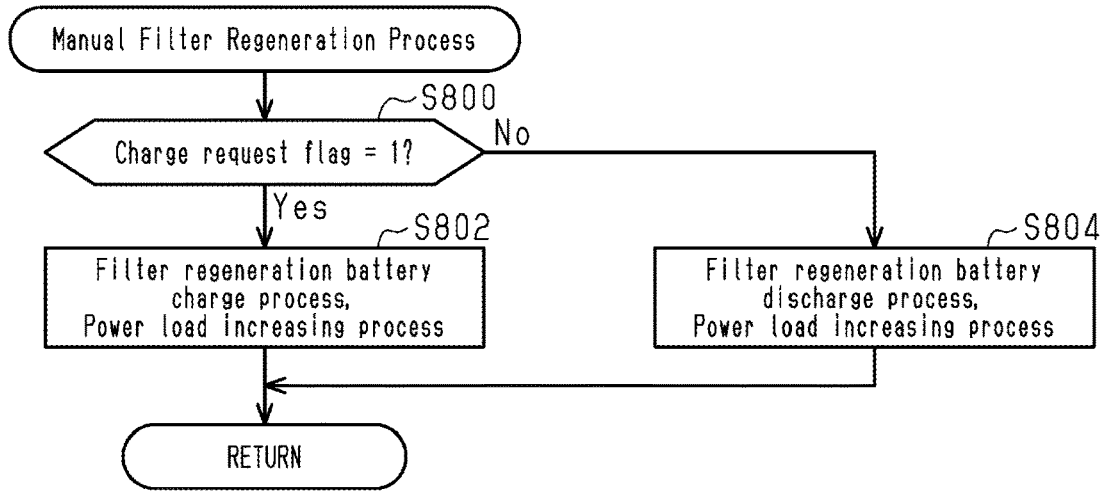
FIG. 8 is a flowchart illustrating a manual filter regeneration process executed by a controller in accordance with a second embodiment.

The manual filter regeneration process executed by the controller 39 in accordance with the second embodiment will now be described with reference to FIG. 8. The manual filter regeneration process is initiated under the condition that the filter regeneration process flag is set to 1 and is ended under the condition that the filter regeneration process flag is set to 0.

In S800, the controller 39 determines whether the charge request flag is 1. When the charge request flag is 1 (S800: Yes), the controller 39 proceeds to S802. In S802, the controller 39 executes a filter regeneration battery charge process and the electric power load increasing process. When the charge request flag is not 1 (S800: No), the controller 39 proceeds to S804. In S804 the controller 39 executes the filter regeneration battery discharge process and the electric power load increasing process.

Advantages of Second Embodiment

The second embodiment has the following advantages in addition to the advantages (1) to (5) of the first embodiment.

(6) The filter regeneration battery charge process, which sends exhaust to the filter 37, regenerates the filter 37 more readily than the filter regeneration battery discharge process.

With the above configuration, the electric power load increasing process is executed during the filter regeneration battery discharge process. This completes discharging of the battery 28 more quickly and restarts the filter regeneration battery charge process more quickly than when the electric power load increasing process is not executed. Therefore, the above configuration accelerates regeneration of the filter 37.

Further, execution of the electric power load increasing process during the filter regeneration battery charge process limits increases in the state of charge SOC of the battery 28 as compared with when the electric power load increasing process is not executed. This allows a filter regeneration battery charge process to be continued and accelerates regeneration of the filter 37.

(7) The electric power load on the vehicle 10 is increased by driving the second motor 13 in a state in which rotation of the drive wheels 25 is physically restricted. This also allows the filter regeneration battery charge process to be executed more frequently thereby facilitating and accelerating regeneration of the filter 37.

(8) With the above configuration, the electric power load on the vehicle 10 is increased by actuating the in-vehicle electrically driven device 29 to consume the power of the battery 28. This also allows the filter regeneration battery charge process to be executed more frequently thereby facilitating and accelerating regeneration of the filter 37.

(9) With the above configuration, a notification is issued by the vehicle 10 to prompt the user to feed electric power to a device outside the vehicle 10. When the user connects an external device to the vehicle 10 accordingly, electric power will be fed to the external device thereby increasing the electric power load on the vehicle 10. This allows a filter regeneration battery charge process to be executed more frequently thereby facilitating and accelerating regeneration of the filter 37.

Modified Examples

The above-described embodiments may be modified as follows. The following modifications can be combined as long as the combined modifications remain technically consistent with each other.

The number of the cylinders 31 may be changed.

In the first and second embodiments, the vehicle 10 includes the first motor 12 and the second motor 13. However, the number of the motors for driving the vehicle 10 may be changed.

In the first and second embodiments, the input unit 51 is arranged in the vehicle 10. However, the input unit 51 may be arranged in a device other than the vehicle 10. The input unit 51 that is arranged in a device other than the vehicle 10 may receive an operation requesting execution of a manual filter regeneration process. In such a case, the controller 39 may receive a signal related to an operation requesting execution of a manual filter regeneration process through wireless communication.

In the first and second embodiments, the load on the engine 11 is increased to raise the exhaust temperature, which, in turn, raise the temperature of the filter 37 in the exhaust passage 33 in a manual filter regeneration process. However, this is just one example. For example, a dither control may be executed to increase the temperature of the filter 37 in the exhaust passage 33 in the manual filter regeneration process. In the dither control, some of the cylinders 31 are set as rich cylinders and the other cylinders 31 are set as lean cylinders. In a rich cylinder, combustion is performed at a lower air-fuel ratio than the stoichiometric air-fuel ratio. In a lean cylinder, combustion is performed at a higher air-fuel ratio than the stoichiometric air-fuel ratio. The exhaust from the lean cylinder that includes a relatively large amount of excess oxygen flows into the filter 37 and increases the oxygen level in the filter 37. Additionally, the exhaust from the rich cylinder that includes a relatively large amount of unburned fuel flows into and is burned in the filter 37. This readily increases the temperature of the filter 37.

Such a dither control is executed when an execution permission condition of the dither control is satisfied. It is determined that the execution permission condition of the dither control is satisfied when, for example, an integrated value InG of the intake air amount since when the engine 11 was started is greater than or equal to a threshold value InGth. The execution permission condition is a condition allowing for determination that the temperature at an upstream side end of the filter 37 has reached the catalyst activation temperature. The execution permission condition is used for facilitating reaction of the oxygen from the lean cylinder and the unburned fuel component and the incomplete combustion component from the rich cylinder so as to increase the temperature of the filter 37 effectively. The integrated value InG is used as an amount that is correlated with the total amount of thermal energy produced by combustion of the air-fuel mixture in the combustion chamber since when the engine 11 was started. Alternatively, the dither control may be executed before the entire filter 37 reaches the catalyst activation temperature.

A manual filter regeneration process may be executed by cutting off the supply of fuel to a single cylinder. In such a case, a cylinder 31 that corresponds to a lean cylinder in the dither control undergoes fuel cutoff. A manual filter regeneration process may be executed by retarding the ignition timing. A manual filter regeneration process may be executed through a lean-racing process in which the engine 11 is revved in a state in which the target air-fuel ratio is set to a higher value than the stoichiometric air-fuel ratio.

In the first and second embodiments, the controller 39 sets the filter regeneration process flag to 1 when the condition in that the PM deposit amount is greater than or equal to the second PM deposit amount threshold value is satisfied and the starting condition of a filter regeneration process flag is satisfied. For example, the controller 39 may set the filter regeneration process flag to 1 When the starting condition of a manual filter regeneration process is satisfied. That is, the condition in that the PM deposit amount is greater than or equal to the second PM deposit amount threshold value may be omitted.

In the first and second embodiments, the starting condition of a manual filter regeneration process is that the gear shifter is arranged at the Park position and that execution of a manual filter regeneration process is requested. The gear shifter does not have to be in the Park position. The starting condition of a manual filter regeneration process may be satisfied when the vehicle speed V detected by the vehicle speed sensor 45 is zero and execution of a manual filter regeneration process is requested.

The manual filter regeneration process may include a process for prohibiting gear shifting. The manual filter regeneration process may include a process for prohibiting execution of a control to respond to an accelerator operation performed by the driver.

In the first and second embodiments, a notification process is executed when the PM deposit amount is greater than or equal to the second PM deposit amount threshold value. Such a notification process may be omitted. For example, as long as information indicating that the PM deposit amount is greater than or equal to the second PM deposit amount threshold value is recorded, a car dealer can acknowledge the necessity for filter regeneration even if a notification process is not executed by checking the record when performing maintenance on the vehicle.

In the first and second embodiments, in S310, the controller 39 sets the charge request flag to 1 when the state of charge SOC of the battery 28 is less than the charge threshold value and sets the charge request flag to 0 when the state of charge SOC of the battery 28 is greater than or equal to the charge threshold value. Instead, in S310, the controller 39 may set the charge request flag to 1 when the state of charge SOC of the battery 28 is less than the discharge threshold value and sets the charge request flag to 0 when the state of charge SOC of the battery 28 is greater than or equal to the discharge threshold value.

In the first and second embodiments, the charge threshold value is greater than the discharge threshold value during a manual filter regeneration process. The charge threshold value may be equal to the discharge threshold value during a manual filter regeneration process. The charge threshold value and the discharge threshold value may be changed during a manual filter regeneration process. Even when the charge threshold value is equal to the discharge threshold value during a manual filter regeneration process, PM will be burned. That is, the oxygen supply will continue while a filter regeneration battery charge process and a filter regeneration battery discharge process are repeatedly executed. Accordingly, filter regeneration will continue while the filter 37 is supplied with oxygen.

In an example, the charge threshold value is 45% and the discharge threshold value is 30% when the filter regeneration process flag is 0, and the charge threshold value and the discharge threshold value are both 75% when the filter regeneration process flag is 1. In such a case, when the filter regeneration process flag is shifted from 0 to 1, the filter regeneration battery charge process is executed to increase the temperature of the filter 37 and burn the PM. Subsequently, the state of charge SOC reaches 75%. The oxygen supply continues as long as the filter regeneration battery charge process and the filter regeneration battery discharge process are repeatedly executed. Thus, the filter regeneration continues even after the state of charge SOC reaches 75%. In other words, when the state of charge SOC is maintained at approximately 75%, the filter regeneration will progress without overcharging the battery 28.

In the first and second embodiments, the filter regeneration battery charge process stops fuel supplied to one of the four cylinders 31 and performs combustion in the remaining three cylinders 31. The fuel supply may be stopped for any number of the cylinders 31. The combustion of fuel and the suspension of fuel supply may be alternately repeated in a cylinder 31. As the deposited amount of PM increases, overheating and erosion of the filter 37 occurs more easily. Thus, an increase in the amount of PM deposit lowers the permissible temperature. Accordingly, as the amount of deposited PM increases, the number of cylinders 31 to which the supply of fuel is stopped may be decreased.

In the first and second embodiments, a filter regeneration battery discharge process includes stopping fuel supplied to every one of the four cylinders 31 and rotating the crankshaft 47, which is the output shaft of the engine 11, with the first motor 12. When stopping the supply of fuel to every cylinder 31, the temperature increase of the filter 37 will be limited thereby restricting regeneration of the filter 37. Instead, a filter regeneration battery discharge process may include stopping fuel supplied to one or more cylinders 31 and supplying fuel to but suspending ignition of the fuel in the remaining cylinders 31. This facilitates regeneration of the filter 37. For example, a filter regeneration battery discharge process may include a process for discharging the battery 28 while burning fuel in one of the four cylinders 31. In other words, the filter regeneration battery discharge process only needs to discharge the battery 28.

In the filter regeneration battery charge process and the filter regeneration battery discharge process in accordance with the first and second embodiments, a friction increasing process may further be executed to increase friction of the engine 11. This decreases the charge amount of the battery 28 in the filter regeneration battery charge process and increases the discharge amount of the battery 28 in the filter regeneration battery discharge process. That is, the friction increasing process has the same advantages as the electric power load increasing process. The friction increasing process may include a process for controlling the engine at a high engine speed. The friction increasing process may include a process for increasing pumping loss. Pumping loss may be increased by advancing the intake valve opening timing with the variable valve timing mechanism 52 and increasing the actual compression ratio. Pumping loss may be increased by closing the throttle valve 34. The friction increasing process may include a process for decreasing the temperature of the engine 11. That is, the friction increasing process may maximize the load of an electrically driven water pump, maximize the load of an electrically driven fan, or turn on a heater (coolant heat dissipation in heater core).

In the second embodiment, an electric power load increasing process is executed both in a filter regeneration battery charge process and a filter regeneration battery discharge process. Instead, an electric power load increasing process may be executed in only one of the filter regeneration battery charge process and the filter regeneration battery discharge process.

In the first and second embodiments, the controller 39 includes a CPU, a ROM, and a RAM and executes software processing. However, this is merely an example. For example, the controller 39 may include a dedicated hardware circuit (e.g., application specific integrated circuit (ASIC)) that executes at least part of the software processing performed in the above embodiments. Specifically, the controller 39 may only have any of the following configurations (a) to (c). (a) The controller 39 includes a processor that executes all processes according to a program and a program storage device such as a ROM that stores the program. In other words, the controller 39 includes a software execution device. (b) The controller 39 includes a processor that executes part of processes according to a program and a program storage. The controller 39 further includes a dedicated hardware circuit that executes the remaining processes. (c) The controller 39 includes a dedicated hardware circuit that executes all processes. There may be more than one software execution device and/or more than one dedicated hardware circuit. Specifically, the above-described processes may be executed by the processing circuitry including at least one of a software execution device and a dedicated hardware circuit. The processing circuitry may include more than one software execution device and more than one dedicated hardware circuit. A program storage device, or computer readable medium, includes any type of medium that is accessible by a versatile computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle, wherein the hybrid electric vehicle includes an internal combustion engine having cylinders, a motor, a battery configured to supply the motor with electric power, and a filter arranged in an exhaust passage of the internal combustion engine to remove particulate matter (PM) from exhaust, the controller comprising:
processing circuitry, wherein
the processing circuitry is configured to execute a manual filter regeneration process when satisfying a condition including that execution of the manual filter regeneration process is requested to decrease a PM deposit amount on the filter and that the hybrid electric vehicle is in a stopped state, and
the manual filter regeneration process includes
a filter regeneration battery charge process that converts an output of the internal combustion engine to electric power for charging the battery while supplying the filter with oxygen from the internal combustion engine when a state of charge of the battery becomes less than a discharge threshold value, and
a filter regeneration battery discharge process that rotates an output shaft of the internal combustion engine with the motor to supply the filter with oxygen from the internal combustion engine when the state of charge of the battery becomes greater than or equal to a charge threshold value that is greater than or equal to the discharge threshold value, and
wherein the processing circuitry is configured to switch from the filter regeneration battery charge process to the filter regeneration battery discharge process when the state of charge of the battery reaches the charge threshold value during the filter regeneration battery charge process.

2. The controller according to claim 1, wherein the filter regeneration battery charge process includes stopping fuel supplied to one or more of the cylinders and supplying fuel to remaining one or more of the cylinders.

3. The controller according to claim 1, wherein the filter regeneration battery charge process includes stopping fuel supplied to one or more of the cylinders and performing combustion in remaining one or more of the cylinders at an air-fuel ratio controlled to be richer than a stoichiometric air-fuel ratio.

4. The controller according to claim 2, wherein
the filter regeneration battery discharge process includes stopping fuel supplied to two or more of the cylinders, and
the filter regeneration battery discharge process stops supplying fuel to more of the cylinders than the filter regeneration battery charge process.

5. The controller according to claim 1, wherein the filter regeneration battery discharge process includes stopping fuel supplied to one or more of the cylinders and supplying fuel to but not igniting the fuel in remaining one or more of the cylinders.

6. The controller according to claim 1, wherein:
the processing circuitry is configured to repetitively execute the filter regeneration battery charge process and the filter regeneration battery discharge process in accordance with a state of charge of the battery until the PM deposit amount becomes less than or equal to a PM deposit amount threshold value; and
the processing circuitry is configured to end the manual filter regeneration process when the PM deposit amount becomes less than or equal to the PM deposit amount threshold value.

7. The controller according to claim 1, wherein the processing circuitry is configured to execute an electric power load increasing process during execution of at least one of the filter regeneration battery charge process and the filter regeneration battery discharge process to increase an electric power load on the hybrid electric vehicle.

8. The controller according to claim 7, wherein
the motor corresponds to a first motor,
the hybrid electric vehicle includes a second motor connected to a drive wheel, and
the electric power load increasing process includes a process that actuates a parking lock and drives the second motor in a state in which rotation of the drive wheel is physically restricted to increase an electric power load on the second motor.

9. The controller according to claim 7, wherein
the hybrid electric vehicle includes an in-vehicle electrically driven device, and
the electric power load increasing process includes a process that actuates the in-vehicle electrically driven device.

10. The controller according to claim 7, wherein the electric power load increasing process includes a process that issues a notification to prompt a user to feed electric power from the hybrid electric vehicle to a device outside the hybrid electric vehicle.

11. A method for controlling a hybrid electric vehicle, wherein the hybrid electric vehicle includes an internal combustion engine having cylinders, a motor, a battery configured to supply the motor with electric power, and a filter arranged in an exhaust passage of the internal combustion engine to remove particulate matter (PM) from exhaust, the method comprising:
executing a manual filter regeneration process when satisfying a condition including that execution of the manual filter regeneration process is requested to decrease a PM deposit amount on the filter and that the hybrid electric vehicle is in a stopped state,
wherein the manual filter regeneration process includes
a filter regeneration battery charge process that converts an output of the internal combustion engine to electric power for charging the battery while supplying the filter with oxygen from the internal combustion engine when a state of charge of the battery becomes less than a discharge threshold value, and
a filter regeneration battery discharge process that rotates an output shaft of the internal combustion engine with the motor to supply the filter with oxygen from the internal combustion engine when the state of charge of the battery becomes greater than or equal to a charge threshold value that is greater than or equal to the discharge threshold value; and
switching from the filter regeneration battery charge process to the filter regeneration battery discharge process when the state of charge of the battery reaches the charge threshold value during the filter regeneration battery charge process.

12. The method of claim 11, further comprising:
switching from the filter regeneration battery discharge process to the filter regeneration battery charge process when the state of charge of the battery reaches the discharge threshold value during the filter regeneration battery discharge process.

13. A controller for a hybrid electric vehicle, wherein the hybrid electric vehicle includes an internal combustion engine having cylinders, a motor, a battery configured to supply the motor with electric power, and a filter arranged in an exhaust passage of the internal combustion engine to remove particulate matter (PM) from exhaust, the controller comprising:

processing circuitry, wherein
the processing circuitry is configured to execute a manual filter regeneration process when satisfying a condition including that execution of the manual filter regeneration process is requested to decrease a PM deposit amount on the filter and that the hybrid electric vehicle is in a stopped state, and
the manual filter regeneration process includes
a filter regeneration battery charge process that converts an output of the internal combustion engine to electric power for charging the battery while supplying the filter with oxygen from the internal combustion engine when a state of charge of the battery becomes less than a discharge threshold value, and
a filter regeneration battery discharge process that rotates an output shaft of the internal combustion engine with the motor to supply the filter with oxygen from the internal combustion engine when the state of charge of the battery becomes greater than or equal to a charge threshold value that is greater than or equal to the discharge threshold value, and
wherein the processing circuitry is configured to switch from the filter regeneration battery discharge process to the filter regeneration battery charge process when the state of charge of the battery reaches the discharge threshold value during the filter regeneration battery discharge process.

\* \* \* \* \*